Oct. 26, 1954   H. G. TELLFORS   2,692,397
BOOK-BINDING MACHINE
Filed July 12, 1950   14 Sheets-Sheet 3
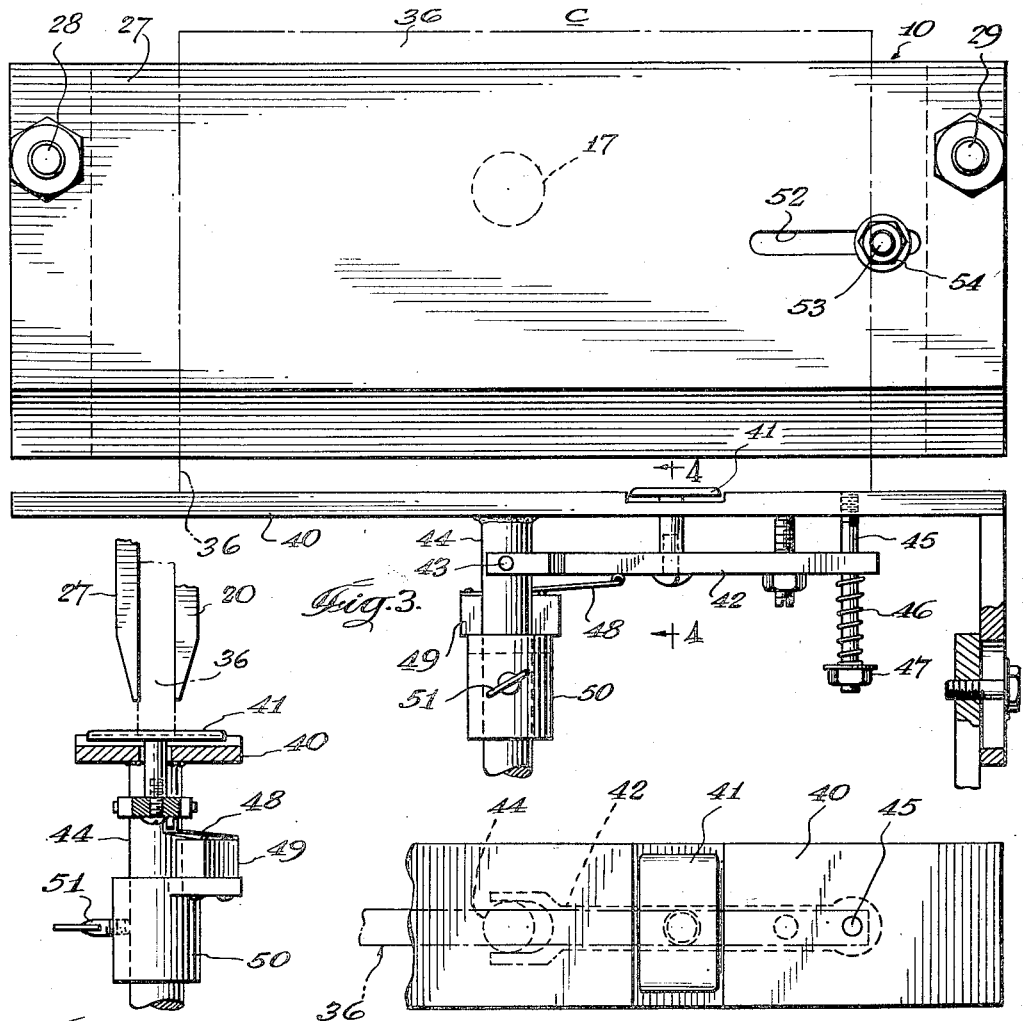
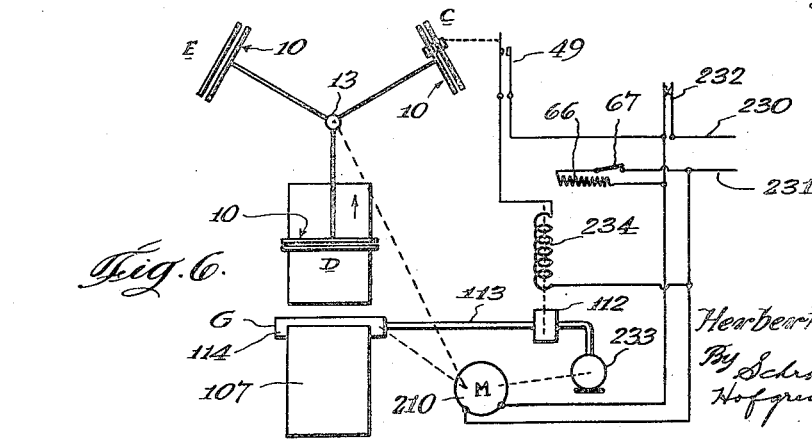

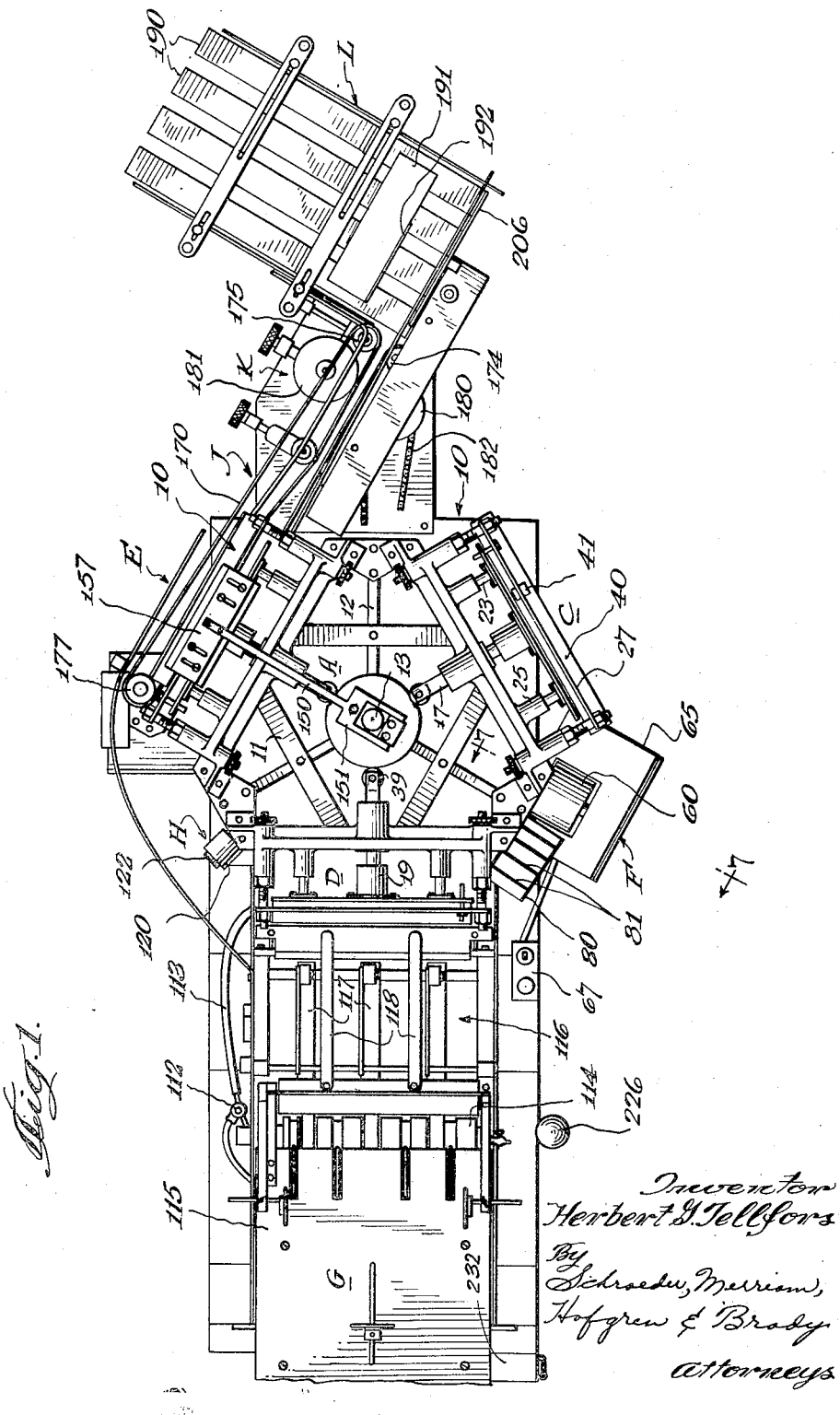

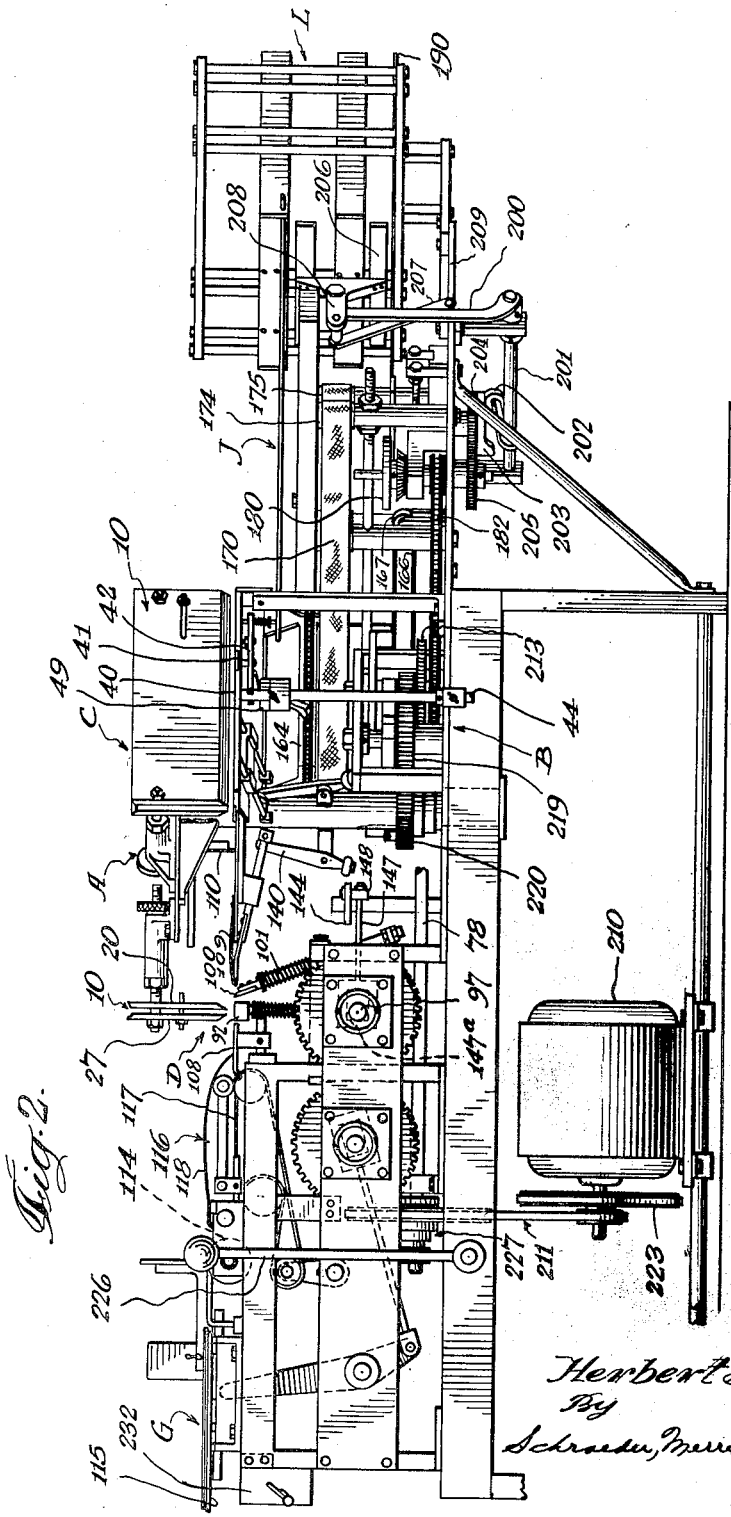

Oct. 26, 1954 H. G. TELLFORS 2,692,397
BOOK-BINDING MACHINE
Filed July 12, 1950 14 Sheets-Sheet 4
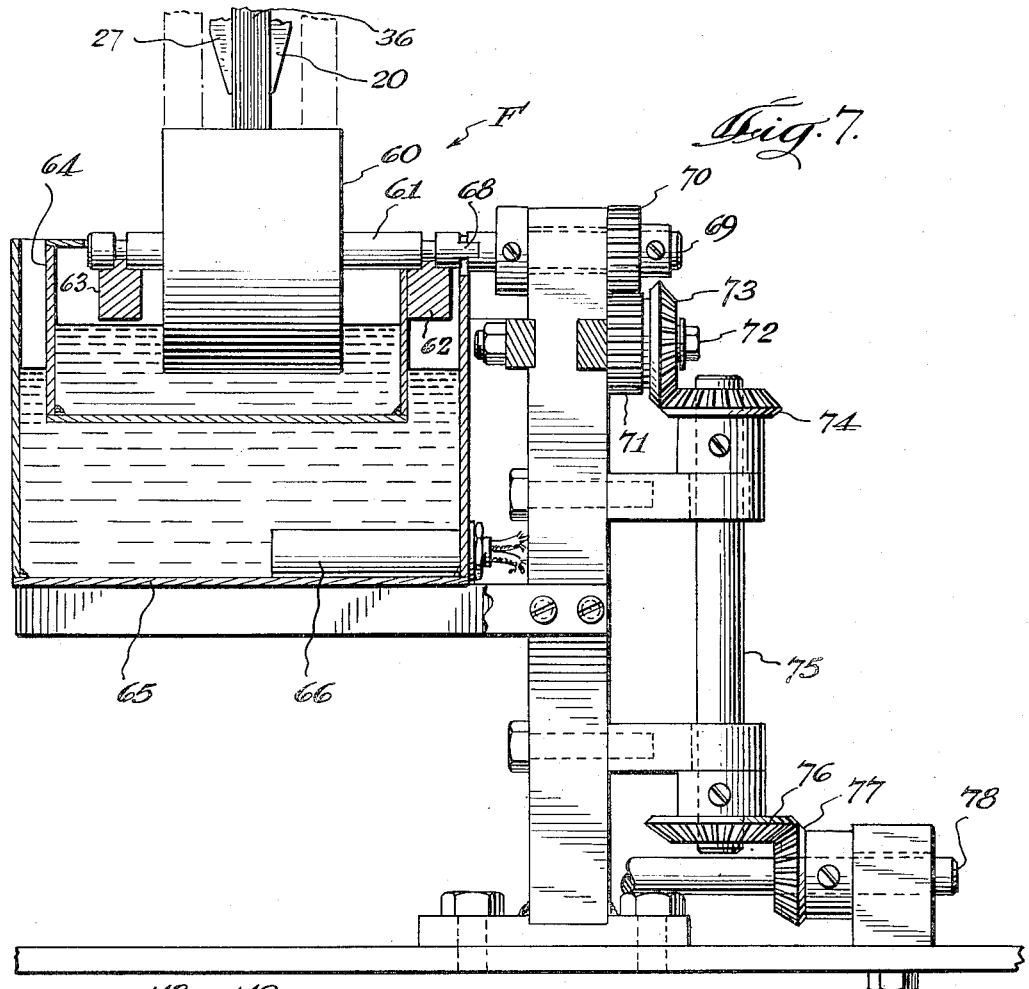
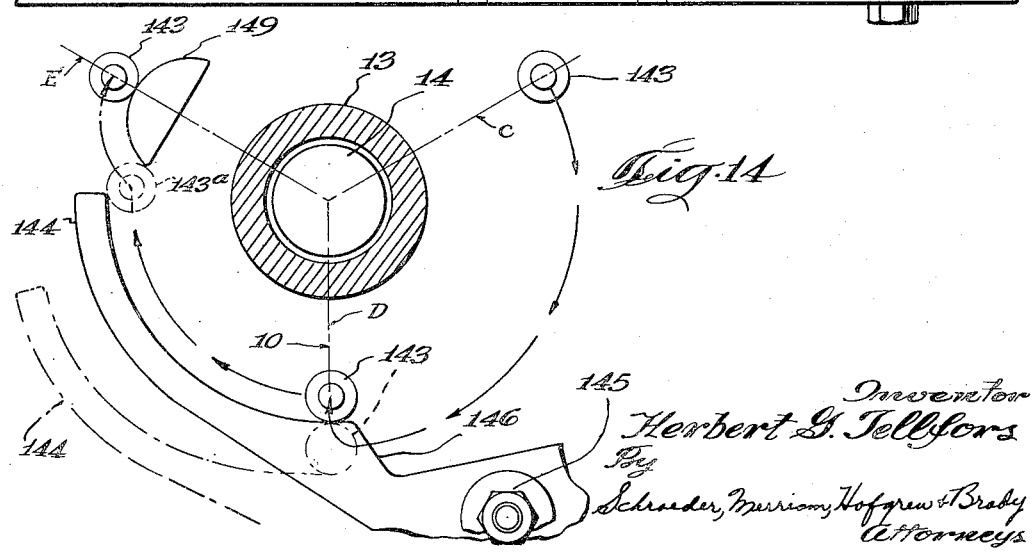
Inventor
Herbert G. Tellfors
By
Schroeder, Merriam, Hofgren & Brady
Attorneys

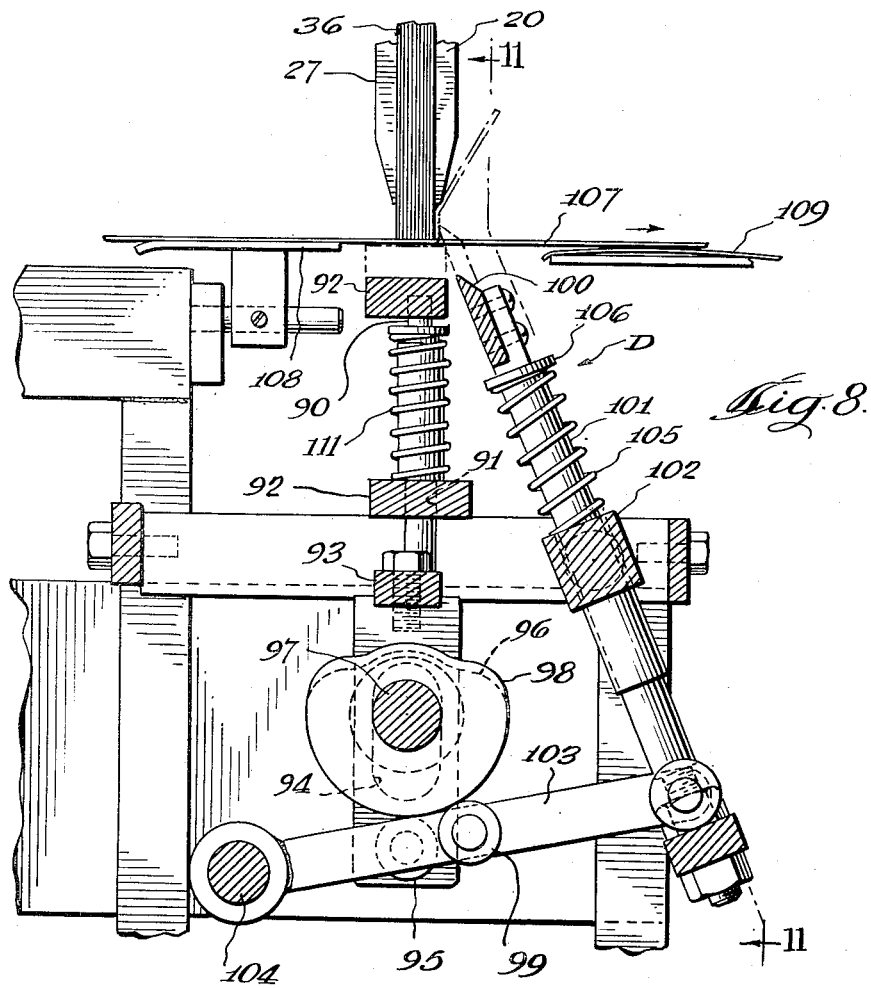
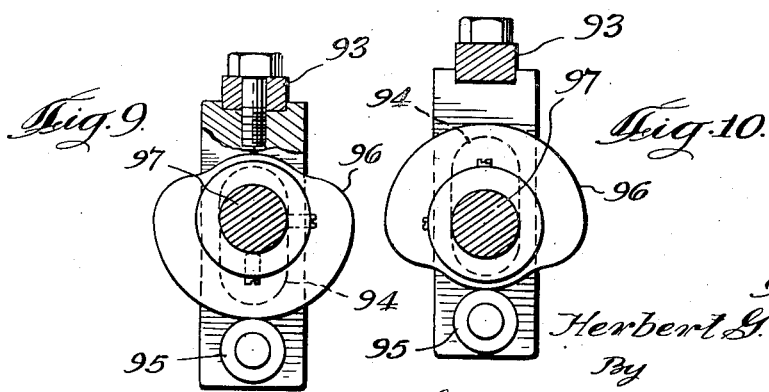

Oct. 26, 1954  H. G. TELLFORS  2,692,397
BOOK-BINDING MACHINE
Filed July 12, 1950  14 Sheets-Sheet 6
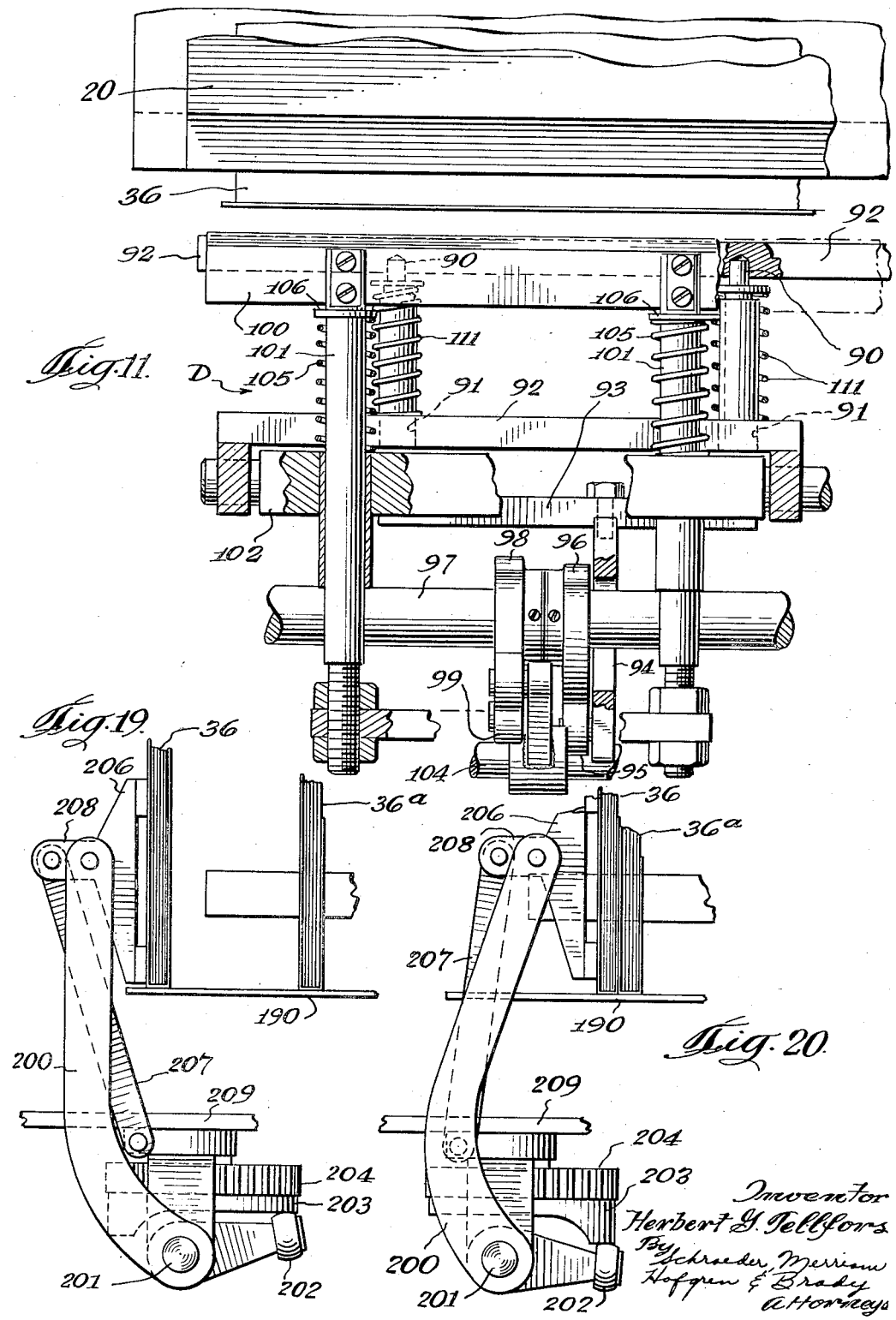

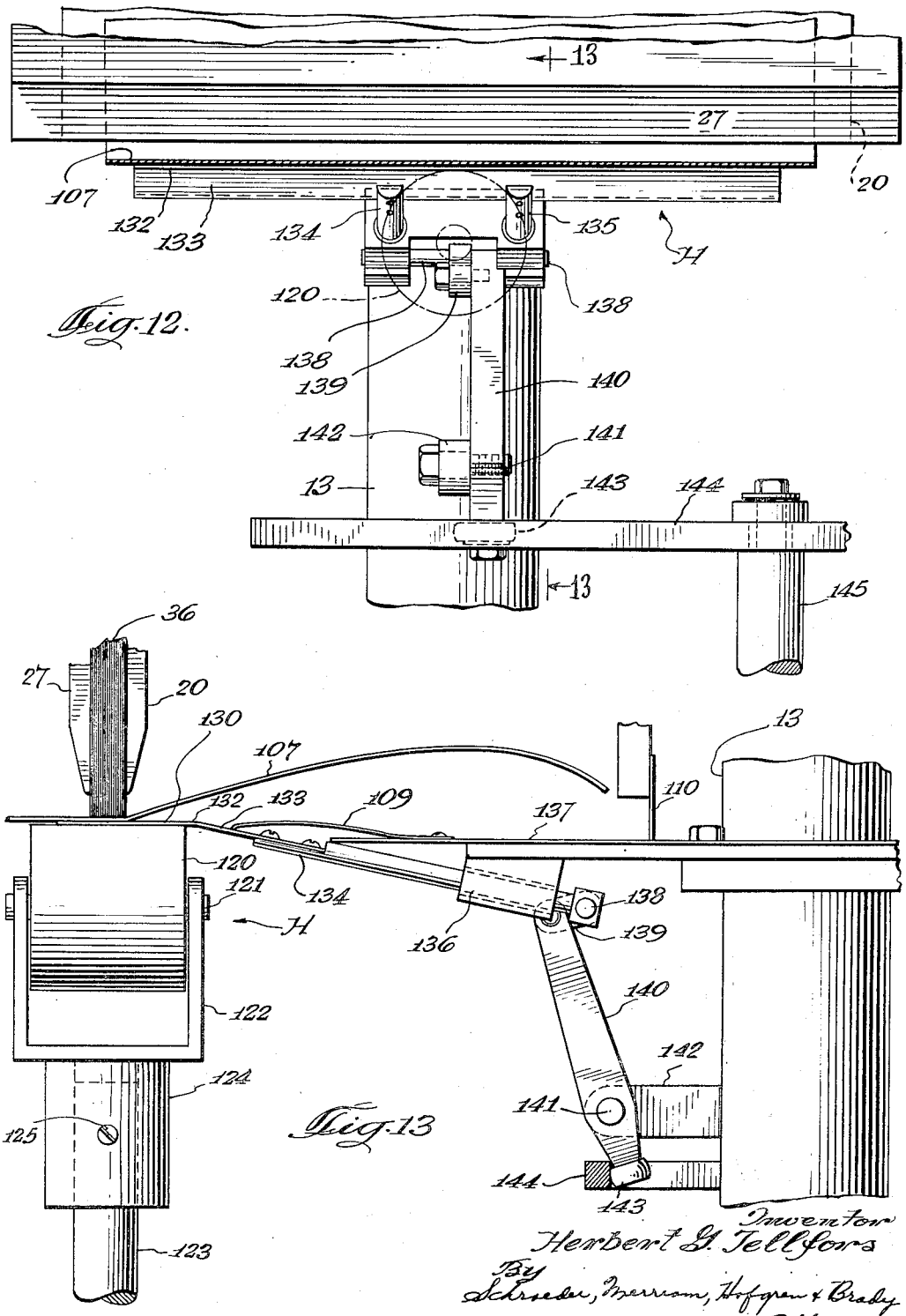

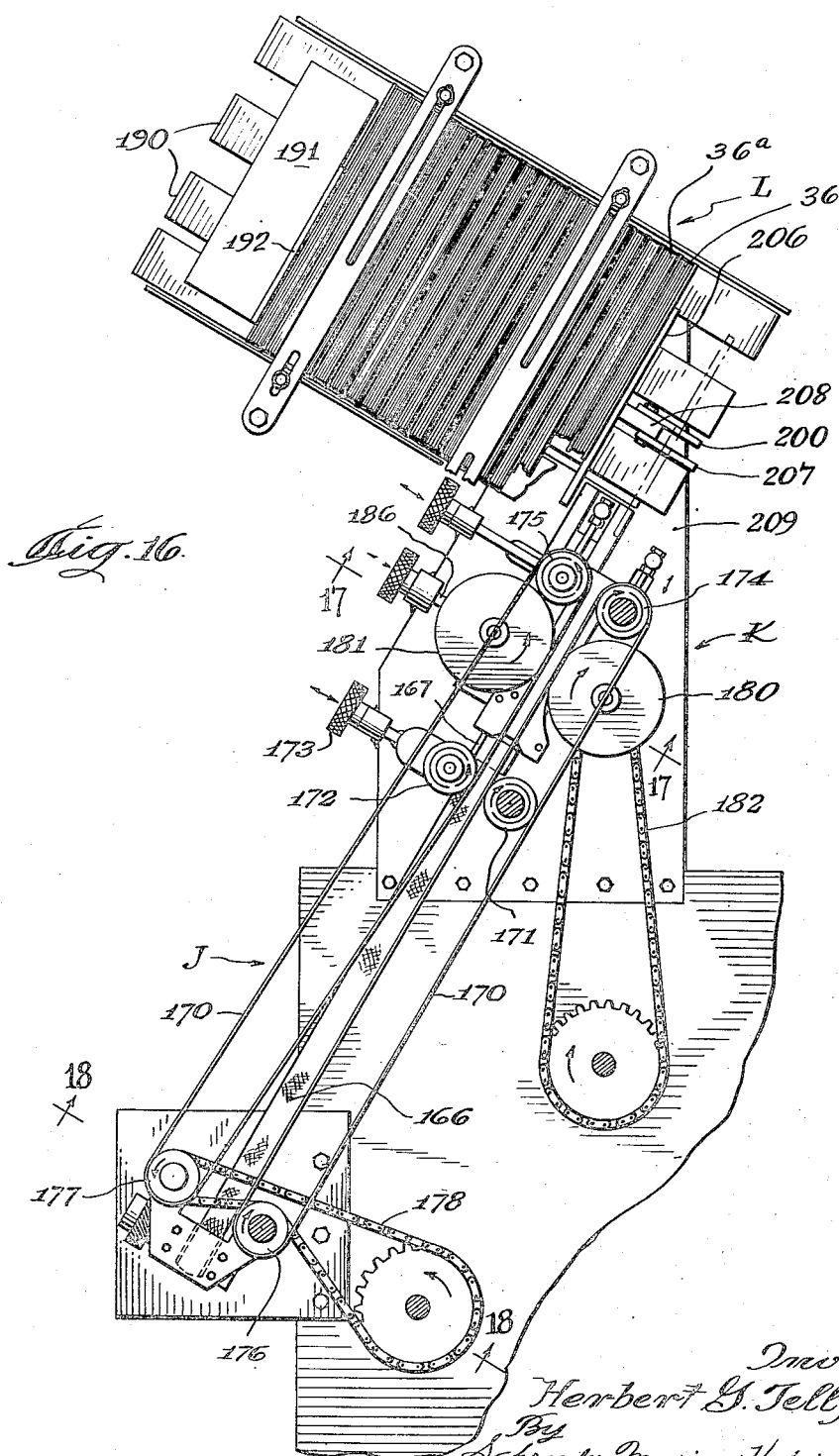

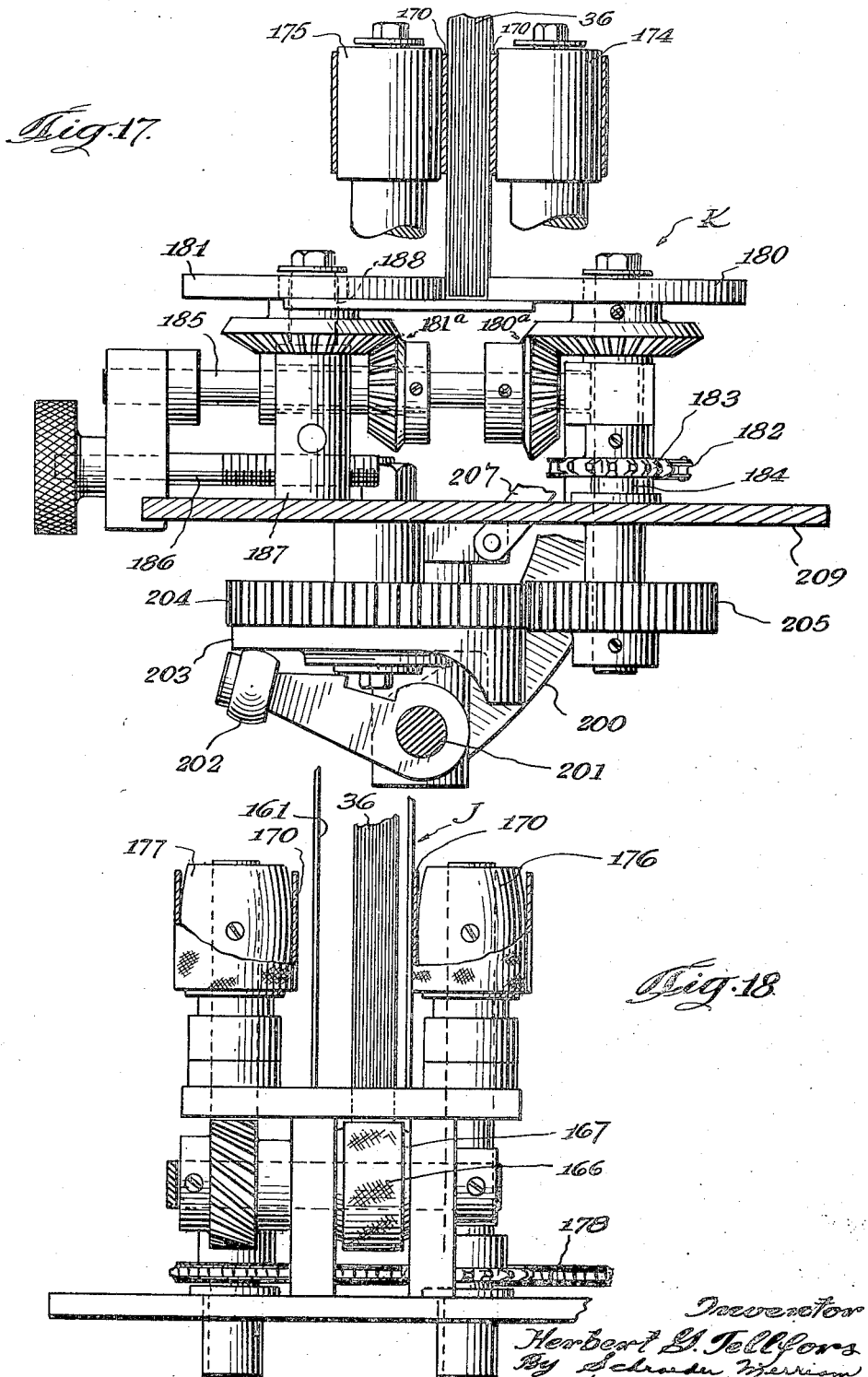

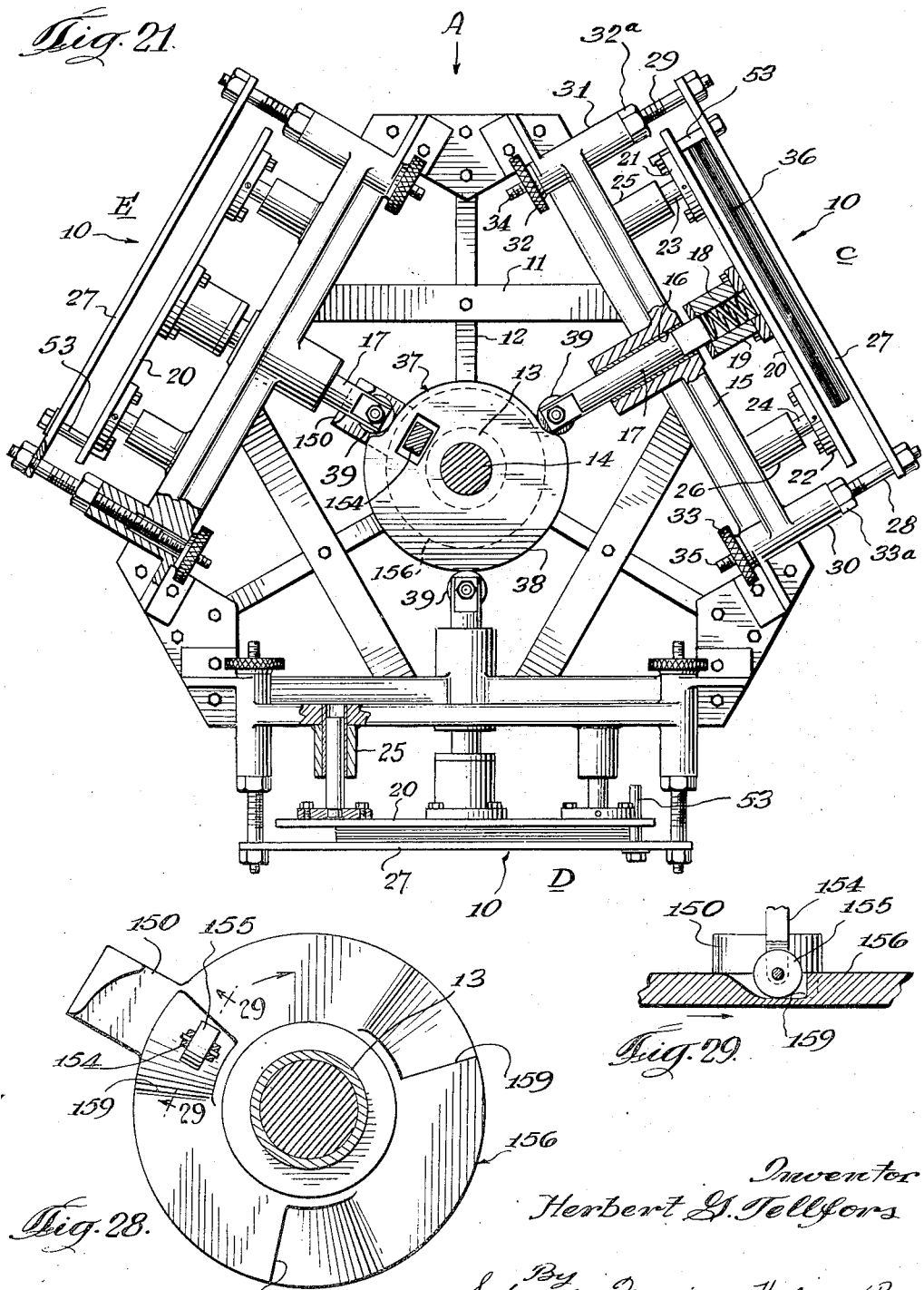

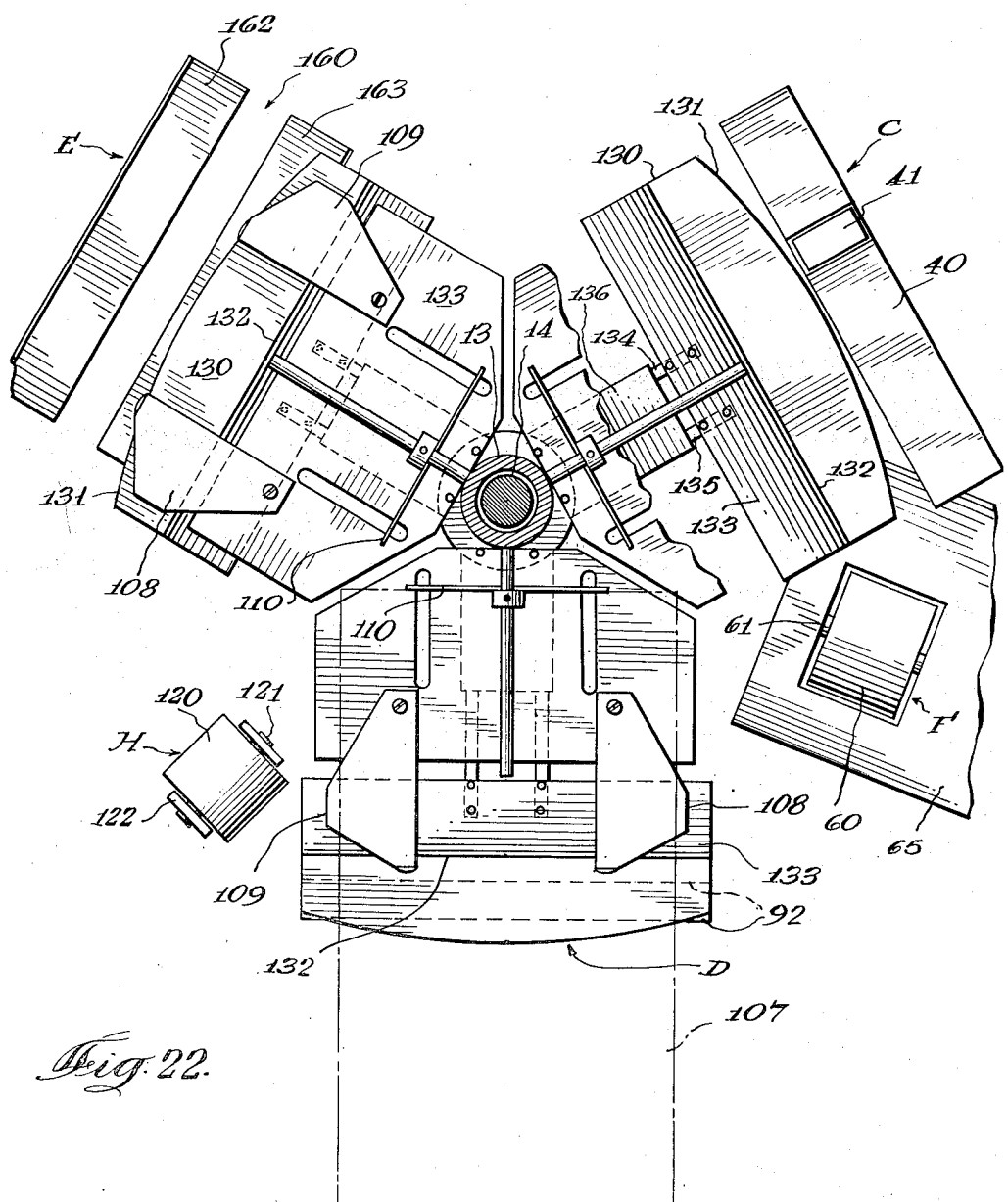

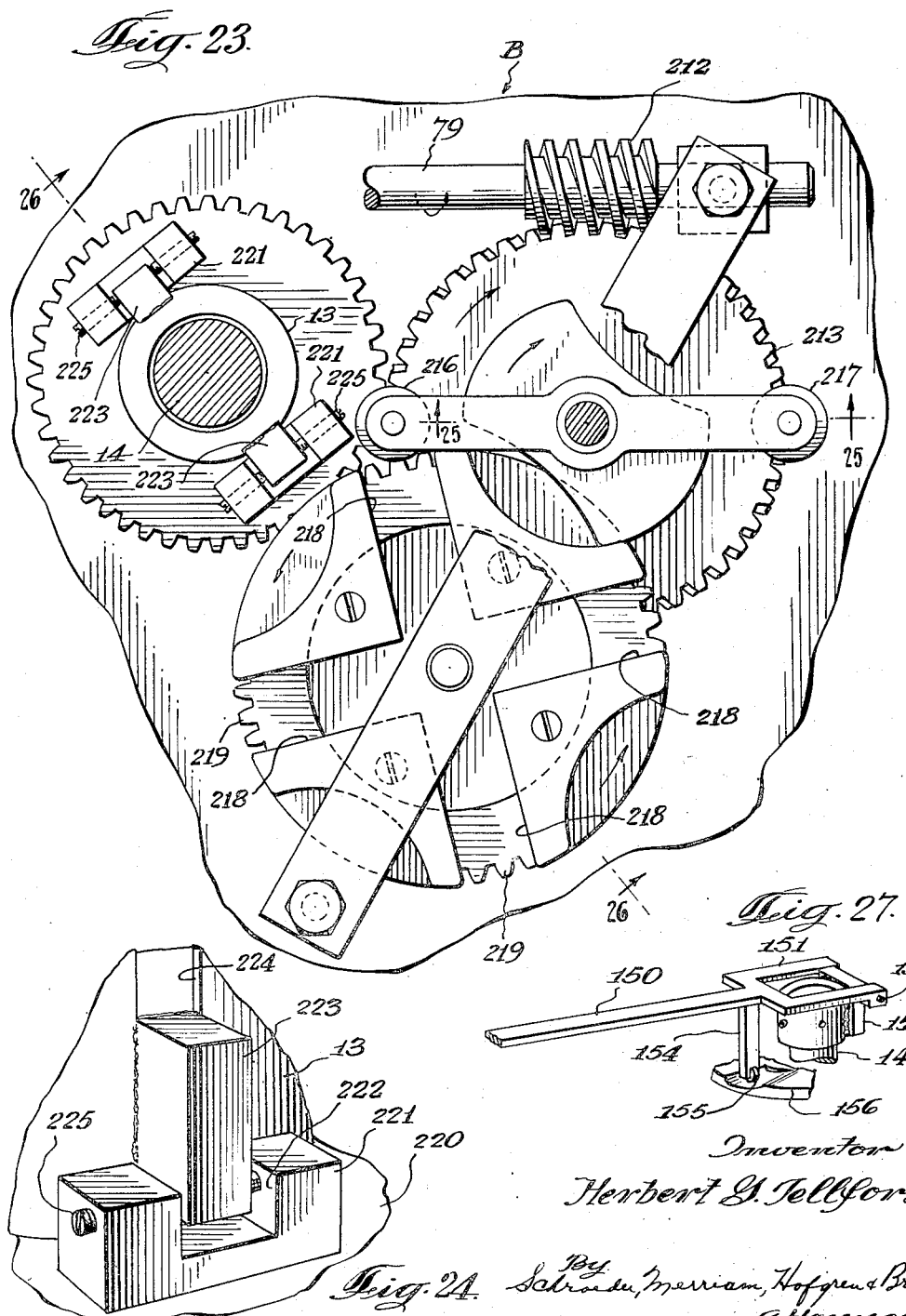

Oct. 26, 1954      H. G. TELLFORS      2,692,397
BOOK-BINDING MACHINE
Filed July 12, 1950      14 Sheets-Sheet 14
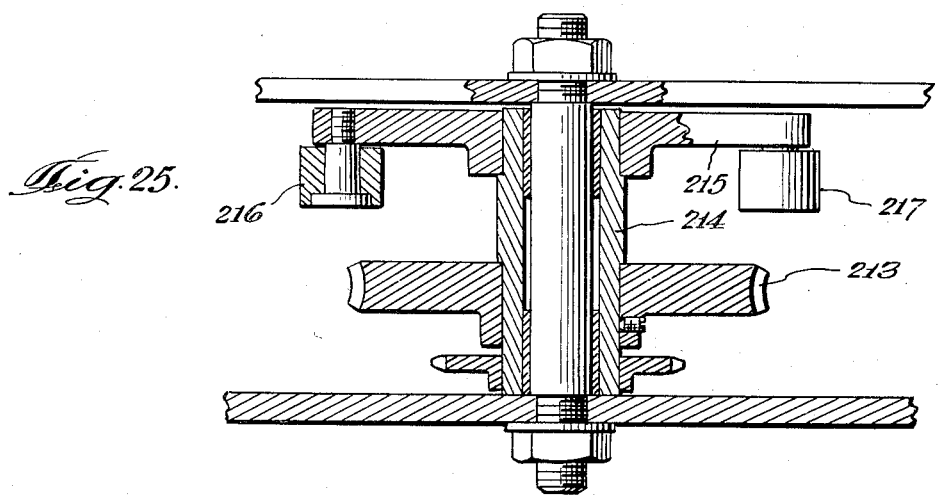
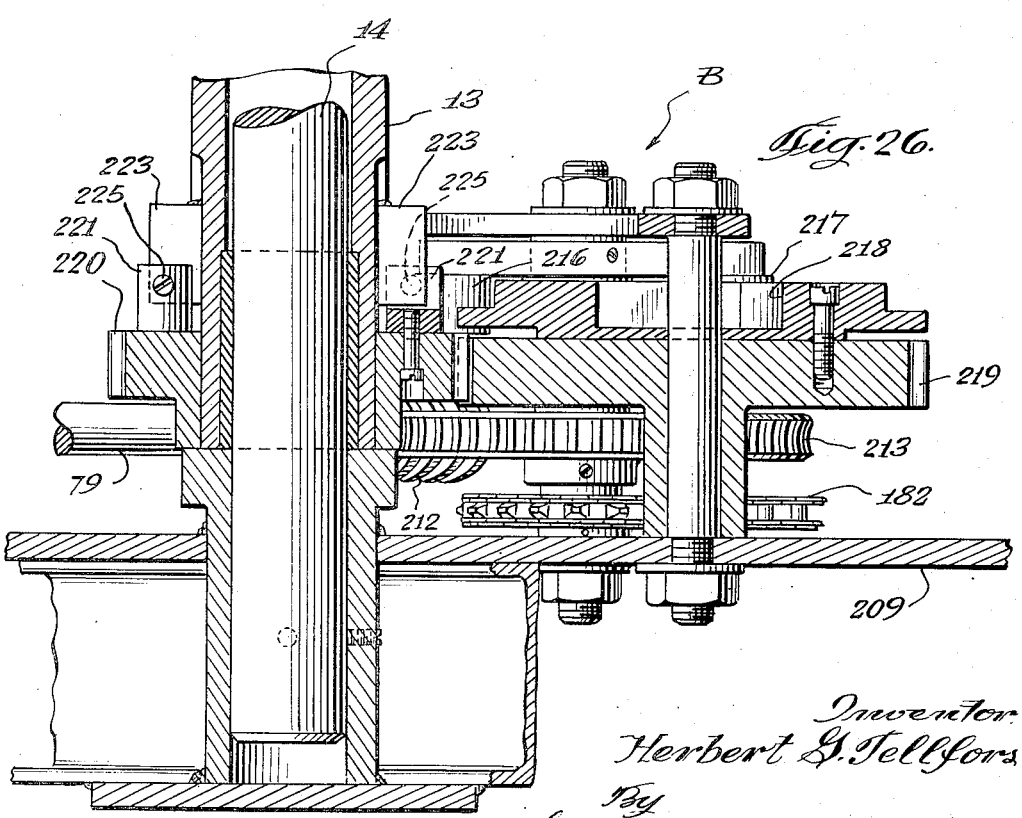
Inventor
Herbert G. Tellfors
By
Schroeder, Merriam, Hofgren & Brady
Attorneys

Patented Oct. 26, 1954

2,692,397

UNITED STATES PATENT OFFICE 2,692,397

BOOK-BINDING MACHINE

Herbert G. Tellfors, Skokie, Ill., assignor, by direct and mesne assignments, of one-half to Clybourn Machine Corporation, a corporation of Illinois, and one-half to Plastic Binding Corporation, Chicago, Ill., a corporation of Delaware Application July 12, 1950, Serial No. 173,282

17 Claims. (Cl. 11—4)

This invention relates to a book binding machine.

It is the general object of this invention to produce a new and improved book binding machine.

One of the principal features of this invention is the provision of a book binding machine which is economical to manufacture and assemble, and when assembled occupies a comparatively small amount of space.

Another feature of the invention is the provision of a book binding machine in which books to be bound are carried in a circular path and during their travel in that path, adhesive is applied to one edge of the book, a cover is then applied to that edge, and then the cover is firmly pressed into the adhesive by a pressure applying device.

As a corollary to the feature of the above paragraph, an additional feature of the machine is the provision of a second path, which may be tangent to the circular path, wherein means are provided for moving the book along the tangent path and for crimping the edges of the cover to produce a final crease on the bookcover.

An additional feature of the invention is the provision of guide means for guiding a book in its travel from the circular path to the tangent path, which guide means operate to fold the extended covers of the book back against the book preparatory to the crimping operation.

As an additional feature of the machine, the tangent path may be positioned below the circular path with the guide means located intermediate the two paths so that the transfer of a book from the circular path through the guide means and into the tangent path may be accomplished by gravity.

A further feature of the invention is the provision of a book binding machine provided with gripping means for gripping a book with the gripping means being rotatable in a circular path intermittently from a loading station to a cover applying station and finally to a releasing station.

Another feature of this invention is the provision of an adhesive applying device between the loading station and the cover applying station adapted to apply adhesive to the edges of the book carried between the stations and the further provision of means for feeding covers to the cover applying station.

A further feature of the invention is the provision of a pressure applying means in the circular path traveled by a book, which means apply a rolling pressure to a cover firmly to press the cover into the adhesive on the edge of the book, together with the provision of pressure transmitting means which may take the form of a plate interposed between the pressure applying means and the cover to prevent the cover from slipping or skidding on the book during the application of the rolling pressure.

A further feature of the invention is the provision of a control means for the cover feeding mechanism with the control means having a member adapted to be actuated when a book is inserted in the gripping means to cause the feeding of a cover to the cover applying station whenever a book is so inserted and to prevent the feeding of a cover in the event that no book is inserted in the gripping means.

A further feature of the invention is the provision of a turret device for carrying the book gripping means in a circular path and wherein the book gripping means are operated by a fixed cam at the center of the path.

Other and further features and advantages of the invention will be apparent from the following description and drawings, in which:

Fig. 1 is a top plan view of the book binding machine;

Fig. 2 is a side elevation of the machine shown in Fig. 1 with certain parts omitted more clearly to illustrate the mechanism;

Fig. 3 is an enlarged detail view of a portion of Fig. 2 showing the details of the cover feed actuating mechanism at the loading station;

Fig. 4 is a sectional view along line 4—4 of Fig. 3;

Fig. 5 is a plan view of the apparatus shown in Fig. 4;

Fig. 6 is a schematic diagram of the electrical and pneumatic circuit for controlling the machine;

Fig. 7 is a sectional view along line 7—7 of Fig. 1 showing the details of the adhesive applying mechanism;

Fig. 8 is a sectional view showing the details of the cover applying station;

Figs. 9 and 10 are views of the first and second cam shown in Fig. 8 for operating the mechanism thereof;

Fig. 11 is a sectional view along line 11—11 of Fig. 8;

Fig. 12 is a plan view showing the gripper mechanism and interposed plate at the pressure applying station;

Fig. 13 is a sectional view along line 13—13 of Fig. 12;

Fig. 14 is a horizontal section showing the details of the cam for operating the interposed plate mechanism shown in Figs. 12 and 13;

Fig. 16 is a plan view of the conveyor system and book storage section;

Fig. 17 is a sectional view along line 17—17 of Fig. 16 showing the details of the crimping mechanism;

Fig. 18 is a sectional view along line 18—18 of Fig. 16 showing the details of the guide chute mechanism;

Figs. 19 and 20 are detail views showing the kicker mechanism for moving a covered book onto the book storage section;

Fig. 21 is an enlarged plan view of the turret mechanism shown in Fig. 1;

Fig. 22 is a view showing the details of the interposed plate mechanism taken substantially along a plane beneath the turret mechanism of Fig. 21;

Fig. 23 is a detail view of the drive system;

Fig. 24 is a detail view of the connection between the drive assembly and the drive shaft for the turret;

Fig. 25 is a sectional view taken along line 25—25 of Fig. 23;

Fig. 26 is a sectional view taken along line 26—26 of Fig. 23;

Fig. 27 is a detail view of the book knockout device;

Fig. 28 is a plan view of the cam for operating the knockout device; and

Fig. 29 is a sectional view along line 29—29 of Fig. 28.

Figure 15:
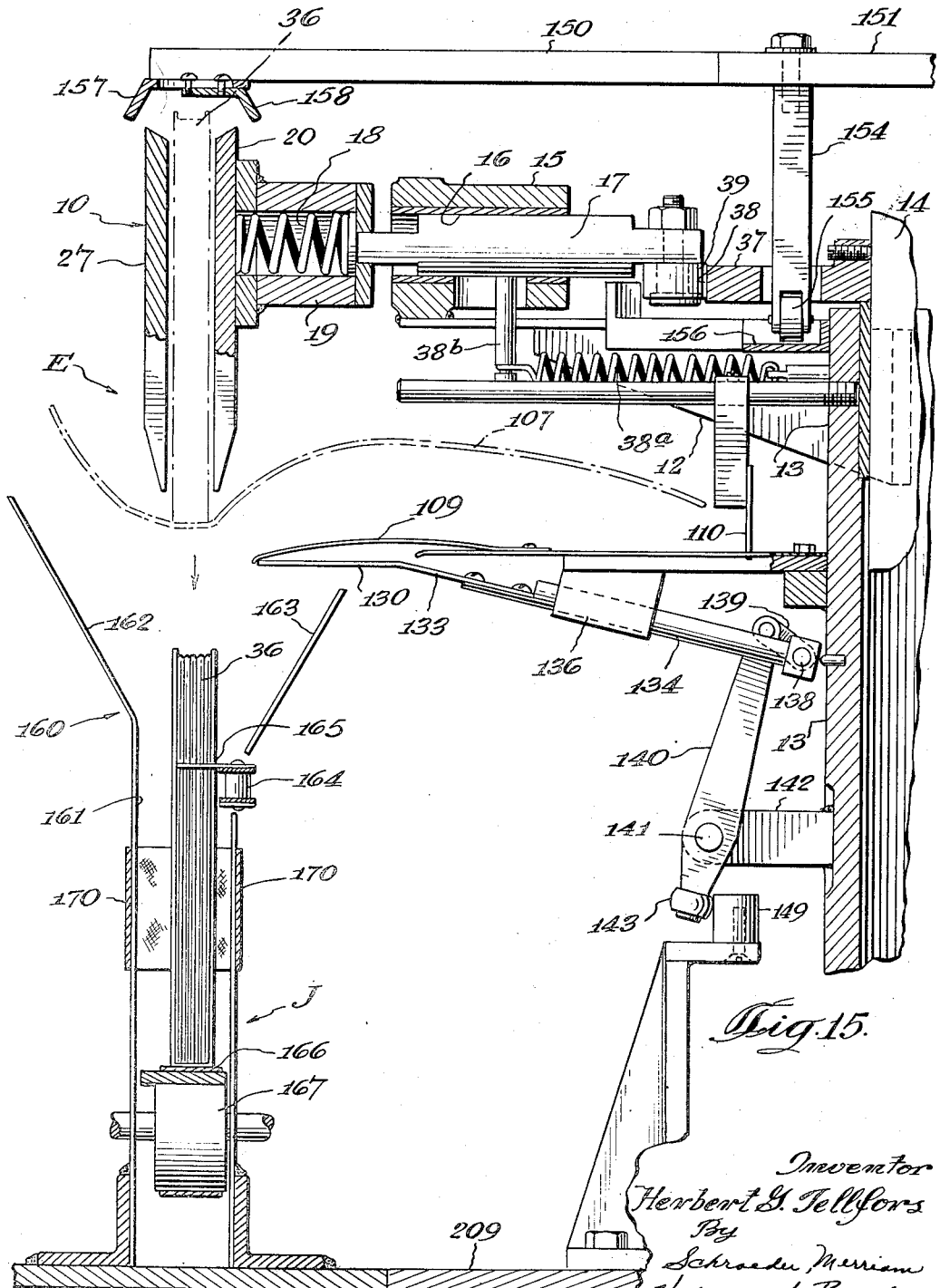
Fig. 15 is a detailed view of the mechanism at the releasing station.

While my invention is susceptible of embodiment in many different forms, I have shown in the drawings and will herein describe in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to Figs. 1, 2 and 21, the book binding machine of this invention comprises a turret generally designated A rotatable about a central shaft and carrying a plurality of book gripping means generally designated 10. In the particular embodiment shown, three of such book gripping means are provided. Means in the form of a Geneva drive B is provided for intermittently rotating the turret A through angles of 120° to bring the gripping means 10 successively to a loading station, generally designated C, a cover applying station D, and a releasing station E.

After a book has been inserted in the book gripping means at the loading station C, the book is carried over an adhesive applying device F to apply adhesive to one edge of the book and halted at the cover applying station D. Means generally designated G are provided for feeding a cover to the cover applying station wherein a cover is applied to the adhesive carrying edge. The drive B then serves to rotate the turret from the station D to the releasing station E with the cover carrying book being passed over a pressure applying device H firmly to press the cover into the adhesive on the edge.

The covered book is released at the releasing station E and drops into a conveyor J which is provided with means for carrying the book along a path substantially tangent to the circular travel of the turret and through crimping means K for crimping the edges of the cover to form a crease in the cover along the edges. After being crimped, the book is delivered to a book storage rack L. Finished books accumulating in the storage rack may be removed from time to time as their number increases.

The turret A comprises a spider having a number of crossbraces 11 and 12 with the braces 12 being secured to a sleeve 13 rotatably mounted about a fixed vertical shaft 14. The sleeve 13 is secured to the drive B in a manner as will hereafter more fully appear. Secured to the crossbraces 11 are the three book gripping means 10, each of said means comprising a crosshead 15 provided with an opening 16 through which an actuating element in the form of a rod 17 extends. The outer end of the rod bears against a compression spring 18 held in a bracket 19 secured to the inner movable jaw 20 of the gripping means. Also secured to the movable jaw is a pair of brackets 21 and 22, each of which carry rods 23 and 24 respectively which extend into a suitable opening in fittings 25 and 26 on the crosshead 15 and serving as guide means for the movable jaw 20 as the latter is moving inwardly and outwardly by the actuating member 17. A fixed jaw 27 is outwardly spaced from the movable jaw and held in fixed (although adjustable) position by means of threaded rods 28 and 29 at each end which extends into openings in brackets 30 and 31, respectively, secured to the crosshead. The spacial relationship between the inner and outer jaws may be adjusted by longitudinal movement of the rods 28 and 29 in the brackets 30 and 31, by rotation of nuts 32 and 33 on the one hand (which are threaded to reduced extensions 34 and 35 of each of the threaded rods) and cooperating nuts 32a and 33a on the other hand. Thus the distance between the movable jaw and the fixed jaw may be adjusted to accommodate various thicknesses of books 36 which may be positioned therebetween.

Movement of the inner jaws 20 inwardly and outwardly relative to the outer jaws 27 is produced by means of a cam arrangement which contacts the inner ends of the members 17. A cam 37 is secured to the fixed shaft 14 and is provided with a cam surface 38 adapted to bear against cam followers in the form of rollers 39 rotatably mounted on the inner ends of each of the shafts 17. With rotation of the sleeve 13 and hence of the spider and the gripping means, the rollers 22 are adapted to ride on the cam surface 38 to permit the movement of the inner jaw inwardly under the influence of spring 38a (Fig. 15) which has one end secured to the sleeve 13 and the other end secured to a rod 38b attached to the member 17, thus opening the gripping means. The open position is illustrated by the two uppermost gripping means of Fig. 21. As the rollers 39 roll onto the larger portion of the cam surface (that is, into the position of the lower gripping means in Fig. 21) the member 17 is moved outwardly, compressing the spring 18, and forcing the movable jaw outwardly toward the fixed jaw to grip a book therebetween. Thus it will be seen that the jaws are opened when the gripping means arrive at the releasing station E and remain opened as the turret rotates clockwise until after leaving the loading station C. The jaws then remain closed from the loading station C around through the cover applying station D and until arrival at the releasing station E. The springs 18 are provided to give the necessary clamping tension between the jaws and also serve as a safety factor in preventing damage to the machine should, through accident, a book of larger than the designed thickness be inserted between the jaws. Under such circumstances the actuating members 17 are still free to move outwardly, even in the presence of an unduly thick book between the jaws, the presence of a thick book serving merely to increase the commpression of the spring 18.

Referring now to Figs. 3 to 5, there is provided at the loading station C a platform 40 positioned directly beneath the opened jaws of a gripping means 10 at the loading station. At this stage a book may be inserted, inner edge downward, into the open jaws so that the inner edge rests upon the platform 40. It will be noted from an inspection of Fig. 3 that the bottom inner edge of the book extends downwardly below the bottom edge of the jaws so that said edge is free of the jaws for its travel through the various stations of the machine.

It might well be stated at this point that while in the specification and claims I refer to the element 36 as being a book, it is to be understood that the book consists of a number of pages which are to be adhesively secured together and provided with an exterior cover during the operation of the binding machine. Thus the book may consist of a number of "signatures" which are folded pages and which have been appropriately notched at the fold to permit adhesive to penetrate to all pages or may consist of a number of separate pages arranged in a desired relationship.

As the edges of the book which are to be supplied with a cover are dropped through the jaws and onto the platform, they depress a switch actuating element 41 mounted for vertical movement through an opening in the platform 40 and connected to an arm 42 pivoted at 43 to a rod 44 secured to the bottom of the platform 40. A second rod 45 is also secured to the bottom of the platform 40 and extends through a suitable opening in the arm 42. That portion of the rod 45 beneath the arm 42 is provided with a spring 46 having one end bearing against the arm and the other end against a nut and washer arrangement 47 in order to urge the arm upwardly to the position shown. Riding on the bottom side of the arm 42 is a switch lever arm 48 adapted to operate a microswitch 49 secured to a collar 50 slidably mounted on the rod 44 and adapted to be secured thereto in any desired position by the set screw 51.

As will hereinafter be more fully explained, the microswitch forms part of an electrical control system for controlling the cover feeding station G so that each time a book is dropped into the gripping means at the loading station a cover will be fed to the cover feeding station, there to be later applied to the book. Should there be a failure to place a book in the gripping means at the loading station, the microswitch will not be actuated and hence no cover will be supplied.

Each of the jaws 20 and 27 are provided with oppositely facing slots 52 adapted to receive a pin 53 extending therethrough. The outer end of each of the pins is provided with a threaded portion to receive a nut 54 to hold the pins in any predetermined position in the slots. Inasmuch as the jaws do not close immediately as the turret rotates a gripping means from the loading station, the initial effect of such rotation is to bring the pin 53 against the side of a book inserted between the jaws to align the book with a predetermined portion of the gripping means. This pre-alignment of a book of course, insures proper performance of the succeeding steps in the book binding operation.

Referring now to Fig. 7, the adhesive applying means F comprises a roller 60 provided with an axle 61 rotatably and removably mounted in blocks 62 and 63 positioned at either end of liquid adhesive container 64. The container 64 is immersed in a hot water tank 65 to keep the adhesive or glue from congealing, and means in the form of electrical heating element 66 is provided for maintaining the proper water temperature. The heating element is controlled by means of a switch 67 (Fig. 1). The roller 60 is made sufficiently wide so as to maintain contact with the free edge of the book as the book is passed in a circular path thereover. In order to insure that a constant film of adhesive is maintained on the surface of the roller 60, means are provided for driving the rollers constantly during operation of the binding machine. To this end the axle 61 is connected by means of a universal joint 68 to a drive shaft 69. The drive shaft is provided with a spur gear 70 meshing with a second spur gear 71 fixed to a shaft 72. A bevel gear 73 on the shaft 72 meshes with a second bevel gear 74 on a shaft 75 which is driven through the medium of the bevels 76 and 77 by a drive shaft 78, driven off the main drive shaft 79 (Fig. 23).

As the book leaves the roller 60 it passes over a scraper in the form of a box 80 (Fig. 1) which is provided with a number of wires 81 which extend transversely across the path of movement of the book to pick up and break off any strings of adhesive that may be hanging from the edge.

As previously pointed out, the intermittent movement of the Geneva drives serves to move a gripping means from the loading station C to a cover applying station D. When the gripping means reaches this latter station the intermittent drive ceases and a cover is applied against the adhesive remaining on the edge of the book.

The means for accomplishing this are best shown in Figs. 8 to 11 inclusive wherein there is shown a pair of rods 90 which extend through suitable openings 91 in a frame member 92 and are connected to a vertically movable crossbar 93. Vertical movement of the crossbar is accomplished by means of a connecting rod 94 which carries a roller 95 at its outer end adapted to contact a cam 96 mounted on a shaft 97 driven by the main drive. Also fixed to the shaft 97 is an outer cam 98 having a cam surface which substantially matches the surface of the cam 96 but, as will be noted in Fig. 8, the cam 98 is provided with cam portions which extend slightly beyond those of the cam 96 so that the movement of the roller 99 which rides on the cam 98 occurs immediately after movement of the roller 95 as that roller rides inwardly toward the shaft and similarly just proceeds the outward movement of the roller 95 as that roller rolls away from the shaft.

The cam 98 and the roller 99 are adapted to operate an elongated breaker bar 100 which is secured to the upper ends of a pair of rods 101 slidably mounted in an elongated collar 102 pivotally fixed to the frame member 92. Pivotally connected to the lower ends of a pair of rods 101 is an actuating bar 103 pivotally mounted at 104 to the frame and carrying the roller 99. A pair of compression springs 105 is interposed between the collar 102 and a pair of second collars 106 secured to the rods 101 and serve to urge the breaker bar 100 upwardly to the position shown in the dotted lines of Fig. 8.

The feeding means G is adapted to feed a cover 107 to the cover applying station D, with the cover coming to rest upon plates 108 and 109 (see also Fig. 22) and abutting against an adjustable stop member 110 (Fig. 13) to bring the cover to a predetermined position relative to the presser foot.

The microswitch 49 controls a solenoid valve 112 (Fig. 1) which in turn controls a pneumatic line 113 connected to a suction pump. The other side of the valve 112 is connected to a suction feed roll 114 which serves to feed a cover from a supply of covers which may be piled on a platform 115 of the feeding means G. When the microswitch has been actuated to open the valve 112 suction is applied to the roll 114 to move the bottom cover of the pile into a conventional transfer means 116 comprising endless traveling driven belts 117 moving toward the cover applying station and guide fingers 118 adapted to press a cover against the belts to deliver the cover to the cover applying station D.

As the book 36 is brought into position and halted at the cover applying station directly over the presser foot 90, the roller 95 rolls off of the circular portion of the cam 96 and towards the shaft 97 to permit the compression springs 111 to force the presser foot upwardly pressing the cover against the adhesive on the edge of the book. Immediately after the upward movement of the presser foot the cam 98 releases the rod 101 so that the breaker bar is propelled upwardly by the springs 105 to bring the edge of the breaker bar against the cover as shown by the dotted lines in Fig. 8. This serves to crease the cover along a line running parallel and immediately adjacent to the inner edge of the book. After this operation has been completed, the cams 96 and 98 retract the presser foot and presser bar, whereupon renewal of the rotation of the turret serves to bring the book, with the cover applied thereto, over the pressure applying means H.

As seen in Fig. 13, the pressure applying means comprises a roller 120 rotatably mounted upon an axle 121 carried in a yoke 122. The yoke is secured to a rod 123 which extends vertically upwardly through a collar 124 fixed to the frame and is held in a predetermined position by means of a locking device 125. The roller is so positioned as to exert a firm pressure against the bottom of the cover 107 firmly to press the cover into the adhesive on the edge of the book. It will be noted that the axis of rotation of the roller 120 is substantially along a radius of the circular path in which the book travels with rotation of the turret. However, as the book is carried in an arcuate path, the pressure applying means, if it bore directly against the cover, would have a tendency to shift the cover from its aligned position on the edge of the book. This is due, of course, to the fact that the inner portion of the edge of the book travels a shorter distance than the outer portion. Accordingly, means are provided to be interposed between the cover and the roller 120. The means travel coincidentally with the book and are adapted to transmit the pressure of the roller to the cover without imparting any sliding or skidding action to the cover.

As best seen in Figs. 12, 13 and 22 the interposing means comprises a flat flexible plate 130 provided with an arcuate outer edge 131 and a bend 132 demarking the flat horizontal portion 130 from an inwardly and downwardly inclined portion 133. The portion 133 is secured to a pair of rods 134 and 135, each of which rods extends through brackets 136 on arms 137 secured to the rotatable sleeve 13. A connecting rod 138 extends between the inner end of the rods 134 and 135 and is pivotally connected by means of a link 139 to an actuating member in the form of a pivoted arm 140. The arm 140 is pivoted at 141 to a fitting 142 secured to the sleeve 13. The arm 140 extends beyond the pivot point 141 and carries a roller 143 at its lower end adapted to bear against a finger cam 144 which serves to pivot the arm clockwise and counterclockwise about the point 141. Such pivotal movement of course, serves to position the plate 130 under the cover and between the cover and the roller 121 and subsequently to withdraw the plate from such a position.

As best seen in Fig. 14, the cam 144 is pivotally mounted on a shaft 145 and has a portion 146 extending beyond the shaft 145 and connected to an actuating rod 147 (Fig. 2) by means of a fitting 148. The rod 147 is reciprocated by a cam 147a in synchronized relationship with the operation of the cams 96 and 98 which withdraw the presser foot and the presser bar. When these two members have been withdrawn and the roller 143 and the cam 144 are in the dotted position shown in Fig. 14, the arm 147 is reciprocated to bring the cam and roller to the position shown in solid lines. This serves to insert the plate 130 beneath the cover before the cover has left the cover applying station and thus prevents any slippage of the cover as it travels from that station to the pressure applying roller.

As the sleeve 13 continues to rotate, the roller 143 reaches the position shown by the dotted roller 143a at which time it strikes a crescent cam 149 which serves to move the roller outwardly and thus retract the plate 130 associated therewith.

Referring now to Fig. 15, as the gripping means 10 reaches the releasing station E the movement of the roller 39 on the cam surface 38 permits the spring 38a to draw the inner movable jaw 28 away from the outer jaw 27 to permit the book 36 to drop from the gripping means. In order to insure that the book will fall from the gripping means, a kickout arm 150 is provided. As best seen in Figs. 15, 27 and 28, the kickout arm is provided with a bifurcated inner end 151 which is hingedly mounted on the shaft 14 by means of pins 152 secured on a plate 153 fixed to the shaft. The arm 150 is provided with a leg 154 having a roller 155 at its lower end rolling on a cam surface 156 fixed to the sleeve 13. The outer end of the arm 150 is positioned directly over the releasing station and is provided with outwardly flaring flanges 157 and 158 adapted to contact the top edge of a book in the gripping means. The upper surface of the cam 56 is flat throughout substantially its entire circumference except for three dished portions 159 (see also Figs. 28 and 29), each of the portions being positioned radially inward from a gripping means. Therefore, as each gripping means reaches the releasing station its associated dished portion 159 passes under the roller 155 allowing the kickout arm 59 to pivot downwardly by gravity to bring the flange portions 157 and 158 against the upper edges of a book. This action serves to knock out any book that may have stuck in the gripping means even though the jaws may have been open. Obviously a spring or some other means may be provided to augment the force of gravity to help swing the arm 151 downwardly. As the sleeve continues its rotation the arm is brought up by riding on the inclined surface of the dished portion to the flat portion of the cam 156.

As a book is released from the gripping means at the releasing station D, it drops into a guide means 160 in the form of a chute 161 having oppositely facing downwardly converging surfaces 162 and 163 which serve to fold the cover back against the sides of the book as shown. The fact that the cover has been creased along one side of the edge by the breaker bar in a previous operation greatly facilitates the passage of the book into the bottom of the guide means, and all difficulties in jamming which have heretofore occurred are eliminated. At the bottom of the guide means is located the conveyor J which includes a chain 164 having a finger 165 adapted to contact one side of the book to move the same on an endless belt 166 mounted on rotatable rollers 167.

Referring to Fig. 16, two endless feed belts 170 and 171 are provided in the conveyor J. It will be noted that the portion of the belts run in the same direction and adjacent the belt 166 and converge towards a pair of feed belt guide rollers 171 and 172. The roller 172 is adjustable toward and away from the roller 171 by the screw means 173 as shown, and thus as the book approaches the crimping means K, the feed belts 170 secure a firm grip on the sides of the book and insure its passage therethrough. The feed belts 170 extend beyond the crimping means K and pass around rollers 174 and 175 and thence return to rollers 176 and 177 adjacent the chute 161. The rollers 176 and 177 are driven by the chain 178 as shown.

The crimping means K which are positioned along the path of the conveyor J comprises a pair of oppositely facing spaced crimping rolls 180 and 181. Each of the rolls is driven by means of the bevel gear systems 180a and 181a. Power is supplied by means of a chain 182 passing around a sprocket 183 secured to a shaft 184 to which the bevel gear arrangement 180a is attached and on which the crimp roll 180 is mounted. One of the bevel gears of the system 180a is secured to a shaft 185 which also carries one of the bevel gears of the system 181a to drive the roll 181. The roll 181 is adjustable toward and away from the roll 180 by means of the adjusting screw 186 which is threaded to a block 187 which carries the shaft 188 about which the roller 181 rotates. As a book 36 is passed along the conveyor and into the space between the rolls, the latter serves to crimp the cover along a line adjacent and parallel to the sides of the edge of the book.

After passing through the crimping means K, the finished book is delivered to the book storage rack L (Fig. 1). The book storage rack L is in the usual form comprising a number of wood slats 190 and includes a book stop 191 having an upstanding side 192 adapted to hold the books in upright vertical position. The book stop is slidable outwardly along the slats 190 as books are fed into the storage rack. In order to slide the book stop, a kicker arm is provided which moves each book outward against the book stop or against the next adjacent book as they are fed to the storage device. As best seen in Figs. 17, 19 and 20, the kicker device includes a crank arm 200 secured to one end of a shaft 201 which is rotatably mounted in a stationary portion of the frame, the shaft 201 being provided at its other end with a cam follower in the form of a roller 202 bearing against the upper surface of a cam 203. The cam is secured to a spur gear 204 which meshes with a second spur gear 205 secured to the shaft 184 and rotated thereby. The crank arm 200 is pivotally secured at its upper end to a kicker plate 206 and is adapted to move the kicker plate inwardly and outwardly in timed sequence with the delivery of the book to the book storage means. Thus, as shown in Fig. 19, as a book 36 is delivered to the storage rack the kicker arm serves to slide the book along the rack against a previously delivered book 36a to the position shown in Fig. 20. A guide arm 207 is pivotally connected at one end to the bracket 208 on the kicker plate and to which the crank arm is connected and at its other end to a portion 209 of the frame of the book storage device.

The drive means B, as previously stated, is a conventional Geneva drive. In order to operate all of the drives of the machine, there is provided an electric motor 210 provided with suitable belts and pulleys 211 to turn the main drive shaft 79. The drive shaft carries a worm 212 meshing with a worm gear 213. As best shown in Fig. 25, the worm gear 213 is fixed to a rotatable shaft 214 which carries an arm 215 to the opposite ends of which are secured intermittent drive mechanisms 216 and 217 of the Geneva drive. As shown in Fig. 23, the drive mechanisms 216 and 217 are adapted to engage appropriate channels 218 secured to a spur gear 219. The spur gear 219 meshes with a second spur gear 220 surrounding the sleeve 13.

Adjustable means are provided for connecting the gear 220 with the sleeve 13 to drive the same, the adjustable means being shown most clearly in Figs. 23 and 24. As shown therein, a channel member 221 is secured to the gear 220, the channel member having a substantially U-shaped channel 222 therein between the sides of which is positioned a block 223 keyed to a slot 224 in the sleeve 13. A screw 225 is threaded through the sides of the channel 221 and touches the block 223 so that the block 223 may be shifted slightly toward or away from either of the sides of the channel and thereby advance or retard the sleeve 13 relative to the gear 220 and line up plates 26 and 27 with presser bar 93. A similar arrangement is provided on the opposite side of the gear 220 and is illustrated in Fig. 23, the same reference numerals being applied to both of the adjusting means.

A clutch lever 226 (Fig. 2) is provided to operate a clutch 227 to disengage the motor 210 from the main drive shaft 79 and in order to provide a rapid stop means for the drive.

The electrical circuit for the machine is shown diagrammatically in Fig. 6 which includes a power line 230, a ground line 231 and a main switch 232 for energizing the circuit. The dashed line between the motor and the sleeve 13 indicates a power connection therebetween as does the dashed line between the motor and the vacuum pump 233 which supplies the vacuum to the line 113 of the cover feeding means. The motor also supplies power to the feeding means G as indicated. The diagram shows the connection between the microswitch 49 and the solenoid 234 which is connected to the valve 112.

I claim:

1. A book binding machine comprising a rotatably mounted carrier, means for intermittently driving the carrier, a plurality of book gripping means carried by the carrier and adapted to carry a book in a circular path with an edge of the book free of the gripping means, means for applying adhesive to said edge, means for feeding a cover to a cover applying station located in said path, means at said station for applying a cover against the adhesive on the edge, pressure applying means positioned in said path for applying pressure along said edge firmly to press the cover into the adhesive on the edge, a plate mounted for movement along said path coincidentally with the gripping means, means for interposing said plate between the cover and the pressure applying means whereby said plate transmits said pressure to the cover, means for releasing a book from the gripping means, a conveyor adapted to receive a released book, and crimping means associated with the conveyor for crimping the covered edge of a book conveyed therethrough.

2. In a book binding machine, a stationary vertical shaft, a rotatable sleeve surrounding the shaft, a trio of book gripping means secured to the sleeve and equally spaced therearound in a single horizontal plane, each of said book gripping means being adapted to carry a book in a circular path with rotation of the sleeve and with an edge of the book free of the gripping means, means for intermittently rotating the sleeve through angles of 120 degrees progressively to rotate a book carried by a gripping means from a loading station to a cover applying station and then to a releasing station, means located in said path intermediate the loading station and the cover applying station for applying adhesive to said edge as said gripping means carries a book from the loading station to the cover applying station, means synchronized with the rotation of a book carrying gripping means to the cover applying station to apply a cover against the adhesive on said edge, pressure applying means located in said path intermediate the cover applying station and the releasing station for progressively applying pressure along said edge as gripping means carries a book from the cover applying station to the releasing station firmly to press the cover into the adhesive on the edge, a plate mounted for movement along said path coincident with the gripping means, means for interposing the plate between said cover and the pressure applying means whereby said plate transmits said pressure to the cover, means for releasing the gripping means as it is rotated to the releasing station to release a book held therein, a conveyor adapted to receive a released book, and crimping means associated with the conveyor for crimping the covered edge of a book conveyed therethrough.

3. In a book binding machine, a rotatably mounted carrier, means for rotating the carrier, book gripping means on the carrier and adapted with rotation of the carrier to carry a book in a circular path with an edge of the book free of the gripping means, means for applying adhesive to said edge, means for applying a cover against the adhesive on the edge, means located in said path for applying pressure progressively along said edge with rotation of the carrier firmly to press the cover into the adhesive on the edge, a plate mounted on the carrier for movement along said path, and means for interposing the plate between said cover and the pressure applying means whereby said plate transmits said pressure to the cover.

4. In a book binding machine, a rotatably mounted carrier, book gripping means on the carrier adapted to carry a book in a circular path with an edge of the book free of the gripping means, means for applying adhesive to said edge, means for applying a cover against the adhesive on the edge, means located in said path for applying pressure progressively along said edge with rotation of the carrier firmly to press the cover into the adhesive on the edge, a flat flexible plate mounted on the carrier for movement radially outwardly into said path, and means for moving said plate radially outwardly to an interposing position between said cover and the pressure applying means during movement of the book thereover to transmit the pressure of the pressure applying means to the cover.

5. In a book binding machine, a rotatably mounted carrier, means for rotating the carrier, book gripping means on the carrier and adapted with rotation of the carrier to carry a book in a circular path with an edge of the book free of the gripping means, means for applying adhesive to said edge, means for applying a cover against the adhesive on the edge, a roller positioned in said path and adapted to press the cover into the adhesive along said edge progressively from one end of the edge to the other with movement of the book along said path, pressure transmitting means carried by the carrier and movable to a position interposed between said roller and the cover for transmitting the pressure of the pressure applying means to the cover, and means for moving the pressure transmitting means into interposition between the roller and the cover.

6. In a book binding machine, a rotatably mounted carrier, book gripping means on the carrier adapted to carry a book in a circular path with an edge of the book free of the gripping means, means for applying adhesive to said edge, means for applying a cover against the adhesive on the edge, a roller positioned in said path and adapted to press the cover into the adhesive along said edge progressively from one end of the edge to the other with movement of the book along said path, a flat flexible plate mounted on the carrier for movement radially outwardly into said path, and means for moving said plate radially outwardly to an interposition position between said cover and the roller during movement of the book thereover to transmit the pressure of the pressure applying means to the cover.

7. In a book binding machine, a stationary vertical shaft, a rotatable sleeve surrounding the shaft, a trio of book gripping means secured to the sleeve and equally spaced therearound in a single horizontal plane, each of said book gripping means being adapted to carry a book in a circular path with rotation of the sleeve and with an edge of the book free of the gripping means, means for intermittently rotating the sleeve through angles of 120 degrees progressively to rotate a book carried by a gripping means from a loading station to a cover applying station and then to a releasing station, a microswitch at the loading station and positioned to be actuated by a book fed into the gripping means at the loading station, means located in said path intermediate the loading station and the cover applying station for applying adhesive to said edge as said gripping means carries a book from the loading station to the cover applying station, means for feeding covers to the cover applying station, an electrically operated control for the feeding means and connected to be energized with actuation of the microswitch to cause the feeding means to deliver a cover to the cover applying station, means synchronized with the rotation of a book carrying gripping means to the cover applying station to apply a cover fed thereto by the feeding means against the adhesive on said edge, pressure applying means located in said path intermediate the cover applying station and the releasing station for progressively applying pressure along said edge as gripping means carries a book from the cover applying station to the releasing station firmly to press the cover into the adhesive on the edge, means for releasing the gripping means as it is rotated to the releasing station to release a book held therein, a conveyor adapted to receive a released book, and crimping means associated with the conveyor for crimping the covered edge of a book conveyed therethrough.

8. In a book binding machine having a book-carrying device, a loading station for inserting a book in said device, and a station for applying a cover to said book, control means comprising means including an electrically actuated device for feeding covers to said cover-applying station, a platform at the loading station adapted to support the book on edge and a control for the feeding means including a microswitch forming a part of said platform and actuated by the insertion of a book into said device, said microswitch being electrically connected to said electrical device and being adapted when actuated to cause the feeding means to deliver a cover to the cover applying station.

9. In a book binding machine, a stationary vertical shaft, a rotatable sleeve surrounding the shaft, a trio of book gripping means secured to the sleeve and equally spaced therearound in a single horizontal plane, each of said book gripping means being adapted to carry a book in a circular path with rotation of the sleeve and with an edge of the book free of the gripping means, and each of said gripping means including a pair of jaws with one jaw of each pair being movable toward and away from the other jaw, an actuating member connected to the movable jaw, a cam fixed to the stationary shaft and contacting the actuating member to open the jaws with rotation of the sleeve to grip and to release a book positioned in the jaws, means for intermittently rotating the sleeve through angles of 120 degrees progressively to rotate a book carried by a gripping means from a loading station to a cover applying station and then to a releasing station, said cam operating to move the movable jaw toward the other jaw as the gripping means is moved from the loading station toward the cover applying station to grip a book inserted therebetween, means located in said path intermediate the loading station and the cover applying station for applying adhesive to said edge as said gripping means carries a book from the loading station to the cover applying station, means synchronized with the rotation of a book carrying gripping means to the cover applying station to apply a cover against the adhesive on said edge, pressure applying means located in said path intermediate the cover applying station and the releasing station for progressively applying pressure along said edge as gripping means carries a book from the cover applying station to the releasing station firmly to press the cover into the adhesive on the edge, said cam operating to move the movable jaw away from the other jaw to release a book held therebetween as the gripping means is rotated to the releasing station, a knock out arm pivotally connected on the stationary shaft and including a member riding on a second cam fixed to the rotatable sleeve, said arm being positioned over the releasing station and normally held thereabove by said second cam, said second cam operating to release the arm for downward pivotal movement against a book in the gripping means as said jaws are opened, a conveyor adapted to receive a released book, and crimping means associated with the conveyor for crimping the covered edge of a book conveyed therethrough.

10. In a book binding machine, a stationary vertical shaft, a rotatable sleeve surrounding the shaft, a trio of book gripping means secured to the sleeve and equally spaced therearound in a single horizontal plane, each of said book gripping means being adapted to carry a book in a circular path with rotation of the sleeve and with an edge of the book free of the gripping means, means for intermittently rotating the sleeve through angles of 120 degrees progressively to rotate a book carried by a gripping means from a loading station to a cover applying station and then to a releasing station, means located in said path intermediate the loading station and the cover applying station for applying adhesive to said edge as said gripping means carries a book from the loading station to the cover applying station, means synchronized with the rotation of a book carrying gripping means to the cover applying station to apply a cover against the adhesive on said edge, pressure applying means located in said path intermediate the cover applying station and the releasing station for progressively applying pressure along said edge as gripping means carries a book from the cover applying station to the releasing station firmly to press the cover into the adhesive on the edge, means for opening the gripping means as it is rotated to the releasing station, a knock-out arm positioned at the releasing station and operating with opening of the gripping means to strike a book therein to release the same, a conveyor adapted to receive a released book, and crimping means associated with the conveyor for crimping the covered edge of a book conveyed therethrough.

11. In a book binding machine, a rotatably mounted carrier, book gripping means on the carrier adapted to carry a book in a circular path with an edge of the book free of the gripping means, means for applying adhesive to said edge, means for applying a cover against the adhesive on the edge, an elongated breaker bar mounted on the machine and normally occupying a position beneath and inwardly spaced from said path, said breaker bar being mounted for movement diagonally upwardly and outwardly against an applied cover to crease the cover along a line running parallel to and immediately adjacent to one side of said edge, means for moving the breaker bar diagonally upwardly and outwardly against the cover, and means for operating the breaker bar moving means in synchronism with the application of a cover to said edge, and means located in said path for applying pressure progressively along said edge with rotation of the carrier firmly to press the cover into the adhesive on the edge, means for releasing a cover-carrying book from the gripping means, and a guide chute located beneath said path and adapted to receive a released book, said chute having downwardly converging surfaces adapted to fold the cover back against the book.

12. In a book binding maching having means for applying an unfolded cover to the edge of a book, folding means comprising an elongated breaker bar mounted on the machine and normally occupying a position beneath and inwardly spaced from said path, said breaker bar being mounted for movement diagonally upwardly and outwardly against an applied cover to crease the cover along a line running parallel to and immediately adjacent to one side of said edge, and means on the machine for moving the breaker bar diagonally upwardly and outwardly against the cover.

13. In a book binding machine, a rotatably mounted carrier, book gripping means on the carrier adapted to carry a book in a circular path with an edge of the book free of the gripping means, means for applying adhesive to said edge, means for applying a cover against the adhesive on the edge, an elongated breaker bar mounted on the machine and normally occupying a position beneath and inwardly spaced from said path, said breaker bar being mounted for movement diagonally upwardly and outwardly against an applied cover to crease the cover along a line running parallel to and immediately adjacent to one side of said edge, means for moving the breaker bar diagonally upwardly and outwardly against the cover and, means for operating the breaker bar moving means in synchronism with the application of a cover to said edge, and means located in said path for applying pressure progressively along said edge with rotation of the carrier firmly to press the cover into the adhesive on the edge.

14. In a book binding machine, a stationary vertical shaft, a rotatable sleeve surrounding the shaft, a trio of book gripping means secured to the sleeve and equally spaced therearound in a single horizontal plane, each of said book gripping means being adapted to carry a book in a circular path with rotation of the sleeve and with an edge of the book free of the gripping means, means for intermittently rotating the sleeve through angles of 120 degrees progressively to rotate a book carried by a gripping means from a loading station to a cover applying station and then to a releasing station, means for closing a book gripping means on a book inserted therein at the loading station as the gripping means is rotated therefrom, a supporting platform at the loading station to support a book inserted in an open gripping means, a pin carried by the gripping means and positioned to contact a side of a book with rotation of the gripping means to slide the book to a predetermined position therein as the gripping means closes, means located in said path intermediate the loading station and the cover applying station for applying adhesive to said edge as said gripping means carries a book from the loading station to the cover applying station, means synchronized with the rotation of a book carrying gripping means to the cover applying station to apply a cover against the adhesive on said edge, pressure applying means located in said path intermediate the cover applying station and the releasing station for progressively applying pressure along said edge as gripping means carries a book from the cover applying station to the releasing station firmly to press the cover into the adhesive on the edge, means for releasing the gripping means as it is rotated to the releasing station to release a book held therein, a conveyor adapted to receive a released book, and crimping means associated with the conveyor for crimping the covered edge of a book conveyed therethrough.

15. In a book binding machine, a rotatably mounted carrier, means for rotating the carrier, book gripping means on the carrier adapted with rotation of the carrier to carry a book in a circular path with an edge of the book free of the gripping means, means for applying adhesive to said edge, means for applying a cover against the adhesive on said edge, a flexible platform movably mounted on the machine, means for moving the platform radially of the carrier from a first position out of said path to a second position, bringing the platform to a second position in which one side of the platform is placed in supporting contact with an applied cover for supporting the cover in applied position, means for moving the platform coincidentally with the book while in supporting position, means for applying a rolling pressure to the opposed side of said platform along a line substantially transverse to the length of said edge firmly to press the cover into the adhesive on said edge, and means for withdrawing the platform from supporting relationship and returning it to said first position.

16. In a book binding machine, a rotatably mounted carrier, means for rotating the carrier, book gripping means on the carrier and adapted with rotation of the carrier to carry a book in a circular path with an edge of the book free of the gripping means, means for applying adhesive to said edge, means for applying a cover against the adhesive on said edge, a flexible platform movably mounted on the machine, means for moving the platform radially of the carrier to a position bringing one side thereof into supporting contact with an applied cover for supporting the cover in applied position, means for moving the platform coincidentally with the book, and means for applying a rolling pressure to the opposed side of said platform firmly to press the cover into the adhesive on the edge.

17. A book binding machine comprising a rotatably mounted carrier, a plurality of book gripping means carried by the carrier and adapted to carry a book in a circular path with rotation of the carrier and with an edge of the book free of the gripping means, means for intermittently rotating the carrier through angles equal to 360° divided by the number of book gripping means progressively to move a book carried by a gripping means from a loading station to a cover applying station and then to a releasing station, an electrical actuator at the loading station and positioned to be actuated by a book fed into the gripping means at the loading station, means located in said path intermediate the loading station and cover applying station for applying adhesive to said edge as said gripping means carries the book from the loading station to the cover applying station, means for feeding covers to the cover applying station, an electrically operated control for the feeding means and connected to be energized by the actuator to cause the feeding means to deliver a cover to the cover applying station, means synchronized with rotation of a book carried by the gripping means to the cover applying station to apply a cover fed thereto by the feeding means against the adhesive on said edge, pressure applying means located in said path intermediate the cover applying station and the releasing station for progressively applying pressure along said edge as a gripping means carries a book from the cover applying station to the releasing station firmly to press the cover into the adhesive on the edge, and means for releasing the gripping means as it is rotated to the releasing station to release a book held therein.

References Cited in the file of this patent

UNITED STATES PATENTS

| Number | Name | Date |
| --- | --- | --- |
| 1,085,888 | Bredenberg | Feb. 3, 1914 |
| 1,088,932 | Ritchie | Mar. 3, 1914 |
| 1,252,879 | Bredenberg | Jan. 8, 1918 |
| 1,355,445 | Bredenberg | Oct. 12, 1920 |
| 1,533,895 | Pleger | Apr. 14, 1925 |
| 1,543,378 | Frazier | June 23, 1925 |
| 2,014,980 | Pearton | Sept. 17, 1935 |